United States Patent [19]

Schulze et al.

[11] Patent Number: 4,859,751

[45] Date of Patent: Aug. 22, 1989

[54] PROCESS FOR EMULSION POLYMERIZATION

[75] Inventors: Joachim Schulze; Klaus Adler; Manfred Selig, all of Burghausen; Peter Ball, Emmerting; Klaus Marquardt, Burghausen; Otmar Killermann, Kirchdorf/Inn; Manfred Hannebaum, Burghausen, all of Fed. Rep. of Germany

[73] Assignee: Wacker-Chemie GmbH, Fed. Rep. of Germany

[21] Appl. No.: 665,787

[22] Filed: Oct. 29, 1984

[30] Foreign Application Priority Data

Dec. 7, 1983 [DE] Fed. Rep. of Germany ....... 3344242

[51] Int. Cl.$^4$ ............................ C08F 2/24; C08F 2/20
[52] U.S. Cl. .................................. 526/200; 526/201; 526/202; 526/204; 526/208; 526/225
[58] Field of Search ............... 526/202, 200, 201, 204, 526/225, 213, 208

[56] References Cited

U.S. PATENT DOCUMENTS

| | | | |
|---|---|---|---|
| 3,830,761 | 8/1974 | Lehney | 526/331 |
| 4,035,329 | 7/1977 | Wiest | 526/331 |
| 4,073,779 | 2/1978 | Wiest | 526/331 |
| 4,123,405 | 10/1978 | Oyamada | 526/345 |
| 4,163,838 | 8/1979 | Kalka | 528/501 |
| 4,164,489 | 8/1979 | Daniels | 526/331 |
| 4,205,161 | 5/1980 | Wiest | 528/487 |
| 4,229,249 | 10/1980 | Felsvang | 528/501 |
| 4,245,073 | 1/1981 | Noël | 526/202 |
| 4,331,577 | 5/1982 | Hanna | 526/331 |

*Primary Examiner*—Christopher Henderson
*Attorney, Agent, or Firm*—Bierman and Muserlian

[57] ABSTRACT

A novel process for the preparation of a readily dispersible, pourable dispersion powder comprising emulsion polymerizing in the presence of a free radical initiator a mixture of 1 to 50% by weight of ethylene and 99 to 50% by weight of an ethylenically unsaturated comonomer phase comprising at least one member of the group consisting of (a) 60 to 100% by weight of vinyl chloride, (b) 0 to 40% by weight of monoethylically unsaturated, oil-soluble monomers, (c) 0 to 10% by weight of monoethylenically unsaturated water-soluble monomers having functional groups and (d) 0 to 5% by weight of oil-soluble monomers that are monoethylenically unsaturated and have functional groups or are multiple ethylenically unsaturated and optionally a protective colloid and/or emulsifier at an ethylene pressure of 10 to 150 bar to obtain an aqueous dispersion of a vinyl chloride-ethyelene copolymer, optionally adding to the aqueous dispersion (e) 0 to 40% by weight, based on the VCE-polymer, of at least one water-soluble substance having a $T_g \geq 60°$ C., (f) 0 to 1% by weight, based on the VCE-polymer, of an antifoaming agent, and (g) 0 to 30% by weight, based on the total weight of polymer constituents, of a finely divided antiblocking agent and spray drying or freeze drying the aqueous dispersion to obtain the readily redispersible, pourable powder of a vinyl chloride-ethylene copolymer and the powder produced by the said process and improved coatings, paints, glues and adhesives containing the said redispersible powder.

8 Claims, No Drawings

PROCESS FOR EMULSION POLYMERIZATION

STATE OF THE ART

Redispersible powders are known and have been successfully used for many years in the construction industry to improve the properties of hydraulically setting systems such as, for example, resistance to abrasion, flexural strength and adhesive power. Normally, such dispersion powders require that they pour readily, have a high stability in storage, and be readily redispersible. The redispersions obtained from the powders with water should have a minimum film-formation temperature (MFT) of from approximately −10° C. to approximately 10° C., for example approximately 0° C., and should have roughly the same mean particle size as the initial dispersions. The redispersions should also remain stable for a relatively long period of time, that is to say, they should not exhibit any tendency to settle.

The commercially available soft redispersion powders which are those having low glass transition temperatures (second order phase transition point; $T_g$) of about 0° C., have the disadvantage that on addition of the powders to the hydraulically setting system, the resistance to pressure decreases dramatically, and the mechanical properties are considerably impaired when the system is stored wet. In fields of use such as floor screeds for example, or generally in systems that are subjected to high pressure loads and/or increased moisture, these attributes may, of course, be disadvantageous. A further drawback of previous redispersion powders is their behavior in fire and it is precisely with the use of larger amounts of powder that this is unfavorable, as the customary fire-shaft test shows (DIN 4102).

A further problem encountered with dispersion powders based on vinyl ester polymers is the susceptibility of these polymers to saponification. For example, powders which have been prepared in accordance with U.S. Pat. No. 3,883,489 and British Pat. No. 1,569,637 and which are intended to have more than 40 to 45% by weight, respectively, of vinyl acetate units, are described in these publications as being useful in the construction industry merely as bonding agents for plastic plasters.

OBJECTS OF THE INVENTION

It is an object of the invention to provide a novel process for the preparation of pourable, readily redispersible powders of copolymers of ethylene and vinyl chloride and the powders produced thereby.

It is another object of the invention to provide improved compositions containing the said readily redispersible powders.

These and other objects and advantages of the invention will become obvious from the following detailed description.

THE INVENTION

The novel process of the invention for the preparation of a readily dispersible, pourable dispersion powder comprises emulsion polymerizing in the presence of a free radical initiator a mixture of 1 to 50% by weight of ethylene and 99 to 50% by weight of anethylenically unsaturated comonomer phase comprising at least one member of the group consisting of (a) 60 to 100% by weight of vinyl chloride, (b) 0 to 40% by weight of monoethylenically unsaturated, oil-soluble monomers, (c) 0 to 10% by weight of monoethylenically unsaturated water-soluble monomers having functional groups and (d) 0 to 5% by weight of oil-soluble monomers that are mono-ethylenically unsaturated and have functional groups or are multiple ethylenically unsaturated and optionally a protective colloid and/or emulsifier at an ethylene pressure of 10 to 150 bar to obtain an aqueous dispersion of a vinyl chloride-ethylene copolymer, optionally adding to the aqueous dispersion (e) 0 to 40% by weight, based on the VCE-polymer, of at least one water-soluble substance having a $T_g$ 60° C., (f) 0 to 1% by weight, based on the VCE-polymer, of an antifoaming agent, and (g) 0 to 30% by weight, based on the total weight of polymer constituents, of a finely divided antiblocking agent and spray drying or freeze drying the aqueous dispersion to obtain the readily redispersible, pourable powder of a vinyl chloride-ethylene copolymer.

The powders produced by the process of the invention especially suitable for use in the construction industry because of their improved properties, and particularly in conjunction with hydraulically setting compounds. Thus, the powders surprisingly avoid the disadvantages of too low a resistance to pressure (compared with powders whose polymers possess comparable minimum film-forming temperatures), and, in the case of wet-storage, the sharp decrease in the mechanical values in hydraulically setting systems, without having to accept losses in the fundamental characteristic properties of redispersion powders such as good redispersibility, resistance to abrasion, adhesive strength and flexural strength in hydraulically setting systems. Moreover, the dispersion powders of the invention show an increased resistance to saponification, a lower combustibility, and also have economic advantages as a result of lower raw material costs.

The vinyl chloride amounts to at least 60% by weight, preferably at least 65% by weight, especially at least 75% by weight, of the comonomer phase b.

Examples of component b which may be copolymerized with the other monomers are: ethylenically unsaturated esters such as allyl esters, and preferably vinyl esters of non-ethylenically unsaturated, preferably saturated, straight-chain, branched or cyclic carboxylic acids, especially of alkanoic acids of 1 to 20 carbon atoms such as vinyl acetate, vinyl propionate, vinyl butyrate, vinyl 2-ethyl hexanoate, vinyl laurate, vinyl stearate, and vinyl esters of highly branched carboxylic acids, which may be prepared, for example, by the so-called Koch synthesis from olefins and carbon monoxide (so-called Versatic ® acid vinyl esters); monoalkyl and dialkyl esters of ethylenically unsaturated carboxylic acids, especially those of alcohols of 1 to 18, preferably 1 to 8, carbon atoms with α,β-unsaturated monocarboxylic acids of 3 to 8 carbon atoms such as methyl esters of acrylic acid, methacrylic acid and crotonic acid, ethylene, propyl, butyl, 2-ethylhexyl, lauryl and stearyl esters of those carboxylic acids, dialkyl esters of ethylenically unsaturated dicarboxylic acids of 4 to 10 carbon atoms such as esters of the mentioned alcohols of 1 to 18 carbon atoms with maleic, fumaric and itaconic acids; α-olefins, for example propylene and butylene; styrene and vinyl toluene; vinyl esters and vinyl ketones; vinyl halides such as vinyl fluoride and vinyl bromide; and vinylidene halides, for example vinylidene chloride.

The esters mentioned, especially the vinyl esters, the acrylic acid esters, the methacrylic acid esters, the maleic acid esters, the fumaric acid esters and the mentioned halide derivatives of ethylene, are preferred. Especially preferred are the specific esters mentioned.

Those monoethylenically unsaturated monomers which do not enter into any further reactions and in particular do not have a cross linking action and which are used alone or in admixture represent at most 40% by weight, preferably at most 35%, in particular from 0 to 25% by weight, of the comonomer phase.

Examples of component c which are monoethylenically unsaturated, water-soluble monomers having functional groups which may be copolymerized with the other monomers, and the amount of which is preferably up to 6% by weight, are compounds which, in addition to an ethylenic double bond, have a carboxyl (COOH— or COO—), sulfonate, hydroxy, phosphate, phosphonate, tert.-amino, quaternary ammonium or polyethylene oxide radical or an amide radical optionally substituted by, for example, alkyl or hydroxyalkyl of 1 to 6 carbon atoms, or alkoxyalkyl of 2 to 6 carbon atoms, alkanoyl of 1 to 6 carbon atoms or alkanoylalkyl of 2 to 6 carbon atoms and are water-soluble to at least 50% by weight (at 20° C.).

Examples of said mmonomers are acrylic acid, methacrylic acid, itaconic acid, fumaric acid and maleic acid; alkali metal or ammonium salts thereof, monoamides and diamides thereof, particularly acrylamide and methacrylamide which may be optionally substituted on the nitrogen atom by alkyl of 1 to 2 carbon atoms and/or by methylol groups, of which in turn one may also be etherified by an alkyl or may be esterified by an alkylcarboxylic acid, monoesters of said dicarboxylic acids with alkanols of 1 to 8 carbon atoms mentioned above, vinylsulfonates and allylsulfonates, vinylphosphates and allylphosphates and phosphonates, sulfonate substituted esters and amides of unsaturated carboxylic acids, or esters or amides of unsaturated carboxylic acids substituted with sulfate styrenes, with N-vinyl pyrrolidone, with tertiary amino or quaternized ammonium groups, and hydroxy esters and amides of unsaturated carboxylic acids.

Preferred water-soluble comonomers which may be contained in the vinyl chloride-ethylene polymer are: acrylic acid, methacrylic acid, itaconic acid, fumaric acid and maleic acid, alkali metal and ammonium salts thereof, monoamides and diamides thereof which may be monosubstituted or disubstituted on the nitrogen atom by methylol; monoesters of said dicarboxylic acids with alkanols of 1 to 3 carbon atoms mentioned above, vinyl sulfonates, and esters or amides substituted with sulfonate groups of unsaturated carboxylic acids, styrenes substituted with sulfonate, N-vinyl pyrrolidone, and esters of unsaturated carboxylic acids substituted with hydroxys. Especially preferred water-soluble monomers are acrylic acid, methacrylic acid, alkali metal and ammonium salts thereof, acrylamide, methacrylamide, N-methylolacrylamide, N-methylol-methacrylamide, vinyl sulfonate, hydroxyethyl(meth)acrylate, esters and/or amides of (meth)acrylic acid substituted with sulfonates such as, for example, sulfoethyl(-meth)acrylate or sulfopropyl(meth)acrylate.

Special preference is given to the use of from 0 to 2% by weight of these comonomers, particularly those that are especially readily soluble in water and act chiefly as stability improvers for the dispersion such as the carboxylic acids, their salts and their amides and especially the sulfates, phosphates and phosphonates. Monomers by means of which the subsequent cross linking may be effected, for example N-methylol(meth)acrylamide, are especially preferably used in amounts of from 0 to 5% by weight.

Furthermore, the comonomer phase may additionally contain monomers d that are oil-soluble, are not readily soluble in water and are preferably water-insoluble in amounts of from 0 to 5% by weight. These monomers have at least one functional group in addition to an ethylenic double bond or they have several ethylenic double bonds. The monoethylenically unsaturated monomers may have as functional groups at least, and preferably, one epoxy, carboxy or hydroxy, or an amide optionally substituted by alkyl and hydroxyalkyl of 1 to 6 carbon atoms, alkoxyalkyl of 2 to 6 carbon atoms, alkanoyl of 1 to 6 carbon atoms or alkanoylalkyl of 2 to 6 carbon atoms, provided that they do not belong to the compounds of component c.

Examples of suitable monomers d are: vinyl and allyl esters of unsaturated monocarboxylic acids of 1 to 8 carbon atoms monovinyl, divinyl, monoallyl and diallyl esters of saturated or unsaturated dicarboxylic acids of 4 to 10 carbon atoms, Z triallyl cyanurate, and diesters and polyesters d of $\alpha,\beta$-unsaturated carboxylic acids with polyfunctional alcohols.

The vinyl chloride-ethylene copolymers preferably comprise monomers of ethylene and vinyl chloride and optionally b and optionally c together. Preferably, they have K-values in accordance with DIN 53 726 (measured in $THF/H_2O$ 95:5) of from 20 to 100, especially preferably from 30 to 80, and in particular from 35 to 70.

Preferably, vinyl chloride-ethylene dispersions of the invention are used which have been prepared, with due regard to the limits disclosed herein, by the process of EP-A-76 511 or the process of German patent application No. 33 12 255.5. The disclosure of these applications shall be regarded in this context also as a part of the present application.

Particularly preferred are vinyl chloride-ethylene polymers containing 1 to 40% by weight of ethylene units, 40 to 99% by weight of vinyl chloride units, 0 to 35% by weight of units of component b, and from 0 to 4% by weight of units of component c. More preferred is a composition of 3 to 35% by weight of ethylene units, 40 to 97% by weight of vinyl chloride units, from 0 to 30% by weight of units of component b, and from 0 to 2% by weight of units of component c. The vinyl chloride units in each case form at least 60% by weight of the units from monomers of the comonomer phase.

For use as vinyl chloride-ethylene polymers, particular preference is given to ethylene/vinyl chloride/vinyl acetate copolymers, ethylene/vinyl chloride/vinyl acetate/butyl acrylate copolymers and ethylene/vinyl chloride/butyl acrylate copolymers, and especially ethylene/vinyl chloride copolymers, in the preparation of which, if desired, still further small amounts of acrylic acid and/or acrylamide have been added to improve the stability of the dispersion (compare U.S. patent application Ser. No. 594,545 filed ).

In the free radical emulsion polymerization of the vinyl chloride-ethylene copolymers, a protective colloid and/or an emulsifier are used and preferably, from 1 to 20% by weight of protective colloid and from 0 to 1% by weight of emulsifier, based on the comonomer phase is used. Particular preference is given to the use of a protective colloid alone.

All compounds which may be used as protective colloids in emulsion polymerization in aqueous phase are suitable in the usual concentrations, which are known to the expert who is able to ascertain the most suitable compounds in a few preliminary experiments. Included among these are, for example, water-soluble vinyl alcohol/vinyl acetate copolymers prepared by hydrolysis (solvolysis) having a hydrolysis degree of from 70 to 99.5 mole percent, preferably from 80 to 99 mole percent, especially from 86 to 90 mole percent, and a preferred molecular weight, determined by viscosimetry, of from 15,000 to 100,000. Particular preference is generally given to these PVAL. Further very suitable examples are, for example, cellulose derivatives, especially hydroxyethylcelluloses with molecular weights of from 50,000 to 1,000,000 and a substitution degree in the range from 1.5 to 3; vinylpyrrolidone polymers, especially polyvinylpyrrolidone, having a molecular weight of from 5,000 to 400,000; starches and starch derivatives such as hydroxyalkylated starches, phosphated and/or sulfated starches, degraded starches, for example dextrins, and mixtures of these, preferably water-soluble and generally commercially available, protective colloids.

With regard to suitable emulsifiers which are preferably used generally in an amount of at most 1% by weight, based on the comonomer phase, reference should be made to the disclosure in the two patent applications already mentioned, Ser. No. 432,275 filed Sept. 24, 1982 and U.S. patent application Ser. No. 594,545 filed.

The vinyl chloride-ethylene dispersions generally have solids contents of from 10 to 75% by weight, preferably from 30 to 65% by weight and the optimal solids content is dependent on the type and amount of the water-soluble substances added (described hereinafter), and is preferably determined simply by viscosimetric measurements with regard to the drying system used. For the preferred spray-drying, a viscosity of the overall system of up to 1 Pa.s has proved especially successful and if desired, the viscosity can be reduced, for example by the addition of water.

If desired, and preferably, the pH of the dispersion can be regulated by the addition of well-known agents such as alkali metal bicarbonates, phosphates and acetates for ammonia, for example to values within the range from 4 to 7.5.

The drying of the vinyl chloride-ethylene dispersion is carried out at a temperature of at least 60° C. in the presence of at least one water-soluble substance having a second-order phase transition point (glass transition temperature, $T_g$) added in amounts of from 0 to 40% by weight, preferably in amounts of from 0 to 30% by weight, particularly in amounts of from 0 to 20% by weight, based on the vinyl chloride-ethylene polymer. The exact optimum amount is dependent on the stability of the vinyl chloride-ethylene dispersion and on the $T_g$ of the vinyl chloride-ethylene polymer contained therein.

It has proved especially successful therein if, to achieve a good redispersibility, the total of the amount of protective colloid used in the preparation of the vinyl chloride-ethylene dispersion, and the amount of water-soluble substance having a $T_g$ of $\geq 60°$ C., which is frequently referred to as an atomizing auxiliary, is at least 5% by weight, especially preferably 8% by weight, based on the vinyl chloride-ethylene polymer. 50% by weight, preferably 30% by weight, have proven to be suitable upper limits for this sum.

It is, of course, also possible to exceed the upper limits mentioned, whereby under certain conditions the redispersibility may even be improved, but after use this may be to the detriment of the mechanical values, expecially after wet-storage.

As an atomizing auxiliary, polymeric water-soluble substances, especially those having high degrees of polymerization, have proven very successful. Examples of such substances which are in many cases commercially available and have also already been used for this purpose are vinyl alcohol copolymers (polyvinyl alcohols), vinylpyrrolidone polymers, cellulose derivatives, starch derivatives, ligninsulfonates, water-soluble condensation products of melamine and formaldehyde, and of naphthalenesulfonic acid and formaldehyde, polyacrylic acid, polyacrylamides, and mixtures thereof.

Preferrence is given to polyvinyl alcohols having a viscosity of from 3 to 50 mPas, preferably from 3 to 35 mPas (according to Hoppler, in 4% by weight solution in water), and a hydrolysis degree of from 60 to 95 mole percent, preferably from 70 to 93 mole percent, and to starch derivatives, preferably yellow dextrin, and special preference is given to mixtures of polyvinyl alcohol and yellow dextrin in a ratio ranging from 1:1 to 30:1, especially from 5:1 to 15:1.

In principle the atomizing auxiliary can be incorporated into the vinyl chloride-ethylene dispersion in any manner desired but preferably, the atomizing auxiliary is added in the form of an aqueous solution wherein the quantity of water used for that purpose may, if desired, at the same time regulate the viscosity of the vinyl chloride-ethylene dispersion.

In the preparation of vinyl chloride-ethylene polymers according to EP-A-76 511, the inert substances used therein are preferably selected and preferably used only in such amounts that the atomizing auxiliary is not rendered soft thereby.

In the atomization, a content of antifoaming agent (defoamer) has proven advantageous in many cases and the quantity may be varied within a wide range. Good results have been obtained with regard to foaming behavior with amounts varying from 0 to 1% by weight based on the vinyl chloride-ethylene polymers. This amount may be further optimized by a few preliminary experiments since it depends on the vinyl chloride-ethylene dispersion and on the atomizing auxiliary. Too great an amount of defoamer should be avoided since flooding may occur when the redispersion powders prepared by the invention are used in hydraulically setting systems. Suitable defoamers are commercially available and do not need to be described here in detail and only silicone-based and hydrocarbon-based ones need be mentioned.

The vinyl chloride-ethylene dispersion, optionally after the addition of the atomizing auxiliary and the defoamer, is dried, preferably spray-dried. Use may be made of the known arrangements for this, for example, spraying through multiple nozzles or using a disc in an optionally heated current of drying gas.

To increase the shelf life and for example, in the case of powders having a low $T_g$, to prevent caking and blocking, and to thus improve the redispersibility, the powder obtained has added to it from 0 to 30% by weight, based on the total weight of the polymer constituents, (vinyl chloride-ethylene polymer and atomizing auxiliary) of antiblocking (anticaking) agent. The addition is preferably carried out while the powder is still finely divided, for example while the powder is still suspended in the drying gas. These agents are metered into the drying arrangement from separate containers but simultaneously with the dispersion.

All antiblocking agents previously used for this purpose may also be used in the invention and they may be added according to a rule of thumb, that is to say, the longer the intended shelf life, the higher also should be the content of antiblocking agent. Suitable antiblocking agents are, for example, finely ground aluminum silicates, kieselguhr, colloidal silical gel, pyrogenic silica, ground clays, light spar, fine silicates, talcum, cements, diatomaceous earths, calcium carbonate, etc. Substances having mean particle sizes of from 0.1 to 50 μm in amounts of from, preferably 4 to 20% by weight, based on the polymeric constituents of the powder, are especially suitable. Where coarser powders are concerned, smaller amounts are generally sufficient.

In the manner and by the process described above, a redispersion powder is obtained which fulfills not only the usual criteria for a good redispersion powder such as good redispersibility and, particularly in hydraulically setting systems, reduced abrasion and improved adhesive and flexural strengths, but surprisingly also exhibits an increased resistance to pressure compared with powders in which the polymer has a similar MFT, and after wet-storage exhibits distinctly less deterioration of their mechanical values such as flexural strength and resistance to pressure and also improved resistance to saponification.

In some instances, known redispersion powders do admittedly attain the values that are achieved with the powders of the invention, but when the different characteristics of the powders prepared by the invention are taken in combination, these powders reach a standard, the well-balanced nature and the quality of which could not have been predicted.

The redispersion powders prepared by the invention are suitable for many applications and generally, it may be said that they are suitable for all purposes for which redispersion powders may be used. Of particular interest is the described combination of the good properties for hydraulically setting systems wherein the powders of the invention are therefore especially preferably used. The powders may, however, also be used to advantage in the construction industry as binding agents, for example for plastic plasters and as adhesives, for example for floor tiles and insulating panels. Additionally, they may also be used equally well in other fields as binding agents, for example in covering and coating media (paints), glues, adhesives, etc. Because of their high vinyl chloride content, the powders are also especially advantageous for adhesives, coatings, etc. which must not be readily flammable.

In the following examples and comparative tests, amounts and percentages refer, unless stated otherwise, to the weight. Percentages furthermore refer in each case to the basis specified in the description and in the claims. The resistance to pressure and the flexural strength were determined according to DIN 1164 (DIN=Deutsche Industrienorm). The Petri value (Petri, Kunststoff, 53 (1963) 421), which is a measure of the resistance to saponification, was measured as follows:

Exactly 10 g of 50% redispersion of the powder were introduced into a 300 ml Schliff-Erlenmeyer flask and the mixture was stirred well with 10 ml of water and neutralized against a mixing indicator M with 0.1N of NaOH. 50 ml of 0.1N NaOH were then added and, while stirring and with the exclusion of air, the mixture was maintained at 60° C. for 48 hours. Back titration was carried out with 0.1N HCl against mixing indicator M or to pH 7 using a pH-meter. The higher the consumption of HCl, the better is the resistance to saponification. The fact that a portion of the sodium hydroxide is consumed by partially saponified polyvinyl alcohol as protective colloid or atomizing auxiliary as a result of subsequent saponification of the polyvinyl acetate units contained therein must be taken into account.

A measure of the redispersibility is given by the tube settling values (RAS) and for this purpose, 50 g of powder were redispersed in 50 ml of water in a Grindomat (manufactured by Messrs. Retsch) and after dilution to 0.5% solids content, the settling level of solids of 100 ml of 0.5% redispersion was measured in settling tubes calibrated in 0.1 ml. The less is the amount of solid matter that has settled after 1 hour and 24 hours, respectively, the better does the redispersion powder redisperse.

In the following examples there are described several preferred embodiments to illustrate the invention. However, it should be understood that the invention is not intended to be limited to the specific embodiments.

EXAMPLE 1

An ethylene/vinyl chloride/vinyl acetate copolymer dispersion was prepared analogously to EP 76 511. First, a mixture of 1,700 g of vinyl acetate and 6,800 g of vinyl chloride was introduced into a tank and 2,000 g of demineralized water and 3,500 g of a 20% solution of a polyvinyl alcohol with a saponification number of 140 and a viscosity of 5 mPas (4% strength aqueous solution at 20° C., according to Hoppler) were introduced into a boiler of 16 liter capacity. A vacuum was then applied which was interrupted with nitrogen and the boiler was then evacuated again, the stirrer driven at 250 min$^{-1}$, and the contents were heated to 50° C.

230 g of commercially available plasticizer mixture (Lusolvan ® (BASF) and 1,700 g of the above-mentioned VC/VAC mixture were added and a pressure up to 65 bar of ethylene was applied which ethylene pressure was maintained to the end of the reaction.

The reaction was initiated by metering in a 3% potassium persulfate solution and a 1.5% formaldehyde sulfoxylate solution at 80 ml/h. Commencing with the initiation of the reaction, the remaining 6,800 g of the VC/VAC mixture were metered in over a period of 4 hours and the pH was maintained at 4.2 to 4.5 throughout the reaction. Once the VC/VAC mixture had been metered in, polymerization was continued for 1 hour with, in each case, 90 ml of the two initiator solutions. The pH was then adjusted to 7 with ammonia and the charge was cooled and then led off into a relaxation vessel. There, the charge was left to stand for 60 minutes under full vacuum to obtain a final dispersion with a solids content of 64%, a K-value of 50, a MFT of 1.5° C. and a $T_g$ of 7.5° C. The sieve residue amounted to 1.8 mg/100 g of dispersion (0.056 mm sieve), and after 1 hour 0 ml, and after 24 hours 0.02 ml, had settled (RAS). The dispersion had a viscosity of 17 Pas (Brookfield viscosimeter, 20 minutes$^{-1}$, stirrer 5) and the resin contained 64% of vinyl chloride units, 16% of vinyl acetate units and 20% of ethylene units.

EXAMPLE 2

Example 1 was repeated using 170 g of dioctyl adipate instead of Lusolvan and the dispersion had a solids content of 63.4% a sieve residue of 4.4 g, a MFT of 4°

C. The settling value after 24 hours was 0 ml and the viscosity was 14 480 mPas (analogous to Example 1). The resin contained 63.5% of vinyl chloride units, 16% of vinyl acetate units and 19.5% of ethylene units.

Atomization 3 g of a commercially available silicone-based defoamer (manufactured by Wacker-Chemie GmbH) and also water and an atomizing auxiliary were added to a quantity of the dispersion as recited in Table I and the dispersion was sprayed through a two-component nozzle. Air compressed to 5 bar served as the atomizing component and the drops formed were dried using air in co-current flow heated to 95° C. The resulting dry powder had 10% by weight of commercially available antiblocking agent (a mixture of calcium magnesium carbonate and magnesium hydrosilicate) added to it and the powders redispersed extremely well and were stable in storage.

Characteristic data of the redispersible powders are also given in Table I.

stirring mechanism. The reactor was rinsed clean of oxygen, the stirrer was set to 150 min$^{-1}$, and 380 g of a mixture of vinyl acetate and vinyl chloride (weight ratio 90:10) were added to the charge from a supply tank. The contents of the autoclave were then heated to 40° C. and, after reaching that temperature, a solution of 3.6 g of ammonium persulfate (APS) in 147 g of water was added. The reactor was then heated to 60° C. and during that time ethylene was admitted to give an equilibrium pressure of up to 30 bar. On reaching an internal temperature of 60° C., the eight-hour metering-in of 3,470 g of the above-described vinyl chloride/vinyl acetate monomer mixture and the solution of 8.2 g of APS in 342 g of water was commenced.

When the metering-in had ended, a further solution of 2.7 g of APS in 100 g of water was added to the charge and the mixture was heated at an internal temperature of 80° C. for 90 minutes. The ethylene pressure was maintained at 30 bar to this point in time and the dispersion was then cooled to 20° C. and relieved of pressure. An aqueous solution of 67.5 g of PVAL 1 and 43 g of

TABLE I

| Example | Amount of dispersion (g) | Amount of water (g) | Atomizing auxiliary as (10% aqueous solution) amount (g) | Atomizing auxiliary viscosity/hydrolysis degree* | Petri value of the 50% redispersion | RAS (ml) after 1 h/24 h |
|---|---|---|---|---|---|---|
| I 1 | 2000 | 2000 | 1100 | PVAL 13/87 | 28.5 | 0.02/0.08 |
| I 2 | 2000 | 3000 | 2200 | PVAL 13/87 | 24.9 | 0.01/0.07 |
| I 3 | 2000 | 2000 | 965 | PVAL 5/94 | 33.1 | 0.02/0.1 |
| I 4 | 2000 | 2000 | 965 | PVAL 5/78 | 26.4 | 0.03/0.15 |
| I 5 | 2000 | 2000 | 965 / 105 | PVAL 13/87 / yellow dextrin | 28.9 | 0.02/0.09 |
| II 1 | 2000 | 1500 | — | — | 36.3 | 0/09/0.3 |
| II 2 | 2000 | 2000 | 510 | PVAL 25/87 | 31.6 | 0.03/0.18 |
| II 3 | 1400 | 1000 | 447 / 444 | PVAL 25/87 / yellow dextrin | 30.6 | 0.02/0.09 |

*PVAL = Polyvinyl alcohol (viscosity determined according to Hoppler at 20° C.; hydrolysis degree expressed in mole percent),
Yellow dextrin: commercial type.
RAS = tube settlement.

Comparative experiments

Products A-F are known, commercially available products and represent the state of the art.

| Comparative example | | MFT | Petri value | RAS 1 h/24 h |
|---|---|---|---|---|
| A | Vinyl acetate/ethylene | 4 | 8.7 | 0.01/0.05 |
| B | Vinyl acetate/ethylene | 4 | 8.9 | 0.01/0.06 |
| C | Vinyl acetate/ethylene | <0 | 20.5 | 0.01/0.04 |
| D | Vinyl acetate/VeoVa* | 5 | 16.5 | 0.16/0.36 |
| E | Vinyl acetate/VeoVa* | 0 | 27.9 | 0.14/0.30 |
| F | Vinyl acetate/ethylene | 0 | 31.5 | 0.17/0.29 |

*VeoVa = vinyl Versatic ® acid ester.

Comparative Example G

Analogously to Example IV of DE-A-22 14 410, the solution adjusted to pH 5.0 and consisting of 3.5 g of sodium lauryl sulfate, 250 g of polyvinyl alcohol (PVAL 1: Hoppler viscosity of 4% by weight aqueous solution at 20° C.: approximately 18 mPas and a hydrolysis degree of approximately 88 mole percent=saponification number 140), 159.5 g of PVAL 2 (Hoppler viscosity approximately 8 mPas, measuring conditions see above; hydrolysis degree approximately 88 mole percent=saponification number 140), 11.1 g of anhydrous sodium acetate, 6.25 g of sodium bisulfite and 3,300 g of water were introduced into a 16 liter autoclave equipped with a temperature regulator and PVAL 2 in 643 g of water was added thereto and gas was then evacuated for 60 minutes by applying a vacuum. The dispersion had a solids content of 48.6% and the polymer had a MFT of 7° C.

3 g of silicone-based defoamer and 2,000 ml of water were added to 1,500 g of this dispersion and the dispersion was spray-dried according to the procedure of the above-described Examples after 10% of antiblocking agent was added to the powder. The 50% redispersion exhibited tube settling values after 1 hour of 0.2 ml and after 24 hours of 0.46 ml and the Petri value was measured at 15.9.

Application tests

As the quality of cement varies, a new zero sample was investigated in each series of measurements to use as an internal standard. The comparison of the different tests particularly shows that the powders prepared by the invention exhibit a substantially more balanced characteristic profile whereas the comparison samples, even when good results were achieved in individual tests, exhibited distinct weaknesses in other tests.

(a) Flexural strength (N/mm$^2$) of mortar prisms by test DIN 1164/67

The redispersion powders were incorporated into the DIN mixture with a plastic cement factor of 0.1 being adhered to and mortar prisms were prepared from this compound in accordance with the DIN test. The resulting values demonstrated the technical advance when using the powders of the invention in different storage tests, the measured results after storage in water drop appreciably less than with known powders. Comparison Example G with a vinyl chloride proportion of less than 40% drops noticeably. The test results are listed in Table II.

(b) Resistance to pressure (N/mm$^2$) of mortar prisms in test DIN 1164/67

The redispersion powders were incorporated into the DIN mixture with a plastic cement factor of 0.1 being adhered to and mortar prisms were prepared from this mixture in accordance with the DIN test. The resulting values demonstrated the technical advance when using the powders of the invention in different storage tests. Appreciably higher resistances to pressure were achieved and the values fell only slightly after wet-storage. Even Comparison Example G with a vinyl chloride proportion of less than 40% was unable to achieve the standard of the powder according to the invention. The results are set out in Table III.

TABLE II

| | Flexural strength (N/mm$^2$) | | |
|---|---|---|---|
| | 28 days in standard operating environment (N/mm$^2$) | 28 days in water (N/mm$^2$) | relative decrease in quality water/standard environment (%) |
| Example | | | |
| | Measurement series 1 | | |
| without powder | 5.63 | 4.21 | −25.3 |
| I 1 | 6.67 | 5.23 | −21.6 |
| I 2 | 6.03 | 4.83 | −20 |
| I 3 | 6.93 | 5.21 | −24.9 |
| I 4 | 6.10 | 4.93 | −19.2 |
| I 5 | 7.12 | 5.21 | −26.9 |
| A | 5.97 | 3.63 | −39.2 |
| D | 6.19 | 3.80 | −38.7 |
| F | 6.20 | 3.75 | −39.6 |
| | Measurement series 2 | | |
| without powder | 5.96 | 4.60 | −23 |
| II 1 | 6.35 | 5.50 | −13.4 |
| II 2 | 6.77 | 5.61 | −17.2 |
| II 3 | 7.73 | 6.10 | −21.1 |
| E | 6.70 | 4.30 | −35.9 |
| G | 6.45 | 4.11 | −36.3 |

TABLE III

| | Resistance to pressure (N/mm$^2$) | | |
|---|---|---|---|
| | 28 days in standard operating environment (N/mm$^2$) | 28 days in water (N/mm$^2$) | relative decrease in quality water/standard environment (%) |
| Example | | | |
| | Measurement series 1 | | |
| without powder | 21.4 | 19.3 | −10.3 |
| I 1 | 19.3 | 18.7 | −3 |
| I 2 | 16.2 | 16.5 | +1.8 |
| I 3 | 20.1 | 19 | −5.5 |
| I 4 | 17.1 | 14.2 | −17 |
| I 5 | 20.9 | 19.4 | −7.2 |
| A | 14.7 | 10.7 | −27.3 |
| D | 16.9 | 12.7 | −24.9 |
| F | 17.1 | 12.9 | −24.6 |
| | Measurement series 2 | | |
| without powder | 38.8 | 38.1 | −1.1 |
| II 1 | 33.25 | 27.3 | −18.2 |
| II 2 | 32.60 | 28.2 | −13.5 |
| II 3 | 36.7 | 32.5 | −11.5 |
| E | 28.3 | 18.2 | −35.7 |
| G | 30.4 | 22.5 | −26 |

TABLE III-continued

| | Resistance to pressure (N/mm$^2$) | | |
|---|---|---|---|
| | 28 days in standard operating environment (N/mm$^2$) | 28 days in water (N/mm$^2$) | relative decrease in quality water/standard environment (%) |
| Example | | | |
| B | 25.0 | 16.6 | −33.4 |

(c) Adhesive strength (N/mm$^2$)

The redispersion powders were incorporated into a typical formulation for floor-tile adhesive and compared with commercially available redispersion powders.

| | Formulation: |
|---|---|
| 50 g | of Portland cement PZ 35 F |
| 50 g | of quartz sand F 34 |
| 0.25 g | of Tylose ® MHB 30 000 (Hoechst AG, hydroxypropylmethyl-cellulose) |
| 2.5 g | of redispersion powder |
| 25 g | of water. |

Tests were carried out using 5×5 cm floor tiles on concrete of goods class 300 (DIN 1045) and the secured floor tiles were subjected to different storage cycles. The redispersion powders of the invention demonstrated clear advantages both with respect to the commercially available products and with respect to comparison product G as shown in Table IV.

TABLE IV

| | Adhesive strength (N/mm$^2$) | | |
|---|---|---|---|
| | 28 days in standard operating environment (N/mm$^2$) | 7 days in standard operating environment plus 21 days in water (N/mm$^2$) | relative decrease in quality water/standard environment (%) |
| Example | | | |
| without powder | 1.01 | 0.66 | −35 |
| I 1 | 1.27 | 1.07 | −16 |
| I 2 | 1.21 | 0.97 | −20.5 |
| I 3 | 1.35 | 1.08 | −20 |
| I 4 | 1.17 | 0.95 | −18.9 |
| I 5 | 1.37 | 1.08 | −22.2 |
| A | 1.43 | 0.93 | −35 |
| C | 1.20 | 0.81 | −32.5 |
| E | 0.93 | 0.66 | −29.1 |
| G | 1.15 | 0.75 | −34.8 |

Various modifications of the products and processes of the invention may be made without departing from the spirit or scope thereof and it is to be understood that the invention is intended to be limited only as defined in the appended claims.

We claim:

1. A process for the preparation of a readily dispersible, pourable dispersion powder capable of forming stable redispersions in water comprising emulsion polymerizing in the presence of a free radical initiator a mixture consisting essentially of 1 to 50% by weight of ethylene and 99 to 50% by weight of an ethylenically unsaturated comonomer phase comprising at least one member of the group consisting of (a) 60 to 100% by weight of vinyl chloride, (b) 0 to 40% by weight of monoethylenically unsaturated, oil-soluble monomers, (c) 0 to 10% by weight of monoethylenically unsaturated water-soluble monomers having functional groups and (d) 0 to 5% by weight of oil-soluble monomers that are mono-ethylenically unsaturated and have functional groups or are multiple ethylenically unsaturated and optionally a protective colloid and free of emulsifier at an ethylene pressure of 10 to 150 bar to obtain an aqueous dispersion of a vinyl chloride-ethylene copolymer, optionally adding to the aqueous dispersion (e) 0 to 40% by weight, based on the VCE-polymer, of at least one water-soluble substance having a $T_g$ 60° C., (f) 0 to 1% by weight, based on the VCE-polymer, of an antifoaming agent, and (g) 0 to 30% by weight, based on the total weight of polymer constituents, of a finely divided antiblocking agent and spray drying or freeze drying the aqueous dispersion to obtain the readily redispersible pourable powder of a vinyl chloride-ethylene copolymer.

2. The process of claim 1 wherein the comonomer phase optionally contains in addition to vinyl chloride (b) ethylenically unsaturated esters of non-ethylenically unsaturated, straight-chain, branched or cyclic carboxylic acids, and/or alkyl esters of ethylenically unsaturated carboxylic acids and/or halogen derivatives of ethylene and (c) ethylenically unsaturated monomers which contain a functional group selected from the group consisting of carboxyl, optionally substituted amide, sulfonate, phosphate, phosphonate and hydroxy.

3. The process of claim 1 or 2 wherein component b is at least one member selected from the group consisting of vinyl esters of alkylcarboxylic acids of 1 to 20 carbon atoms, alkyl of 1 to 18 carbon atoms esters with $\alpha,\beta$-unsaturated monocarboxylic acids of 3 to 8 carbon atoms and dialkyl of 1 to 18 carbon atoms esters of ethylenically unsaturated dicarboxylic acids of 4 to 10 carbon atoms, vinyl halides and/or vinylidene halides.

4. The process of claim 1 or 2 wherein component c is at least one member of the group consisting of acrylic acid, methacrylic acid, alkali metal and ammonium salts thereof, acrylamide, methacrylamide, N-methylolacrylamide, N-methylolmethacrylamide, vinyl sulfonate, hydroxyethyl(meth)acrylate, sulfoethyl(meth)acrylate and sulfopropyl(meth)acrylate.

5. The process of claim 1 or 2 wherein component c is a water-soluble substance with a $T_g$ 24 60° C. and is at least one member selected from the group consisting of vinyl alcohol copolymers, starch derivatives, vinylpyrrolidone (co)polymers, polyacrylic acid, polyacrylamide, cellulose derivatives, ligninsulfonates, melamine-formaldehyde condensation products and naphthalenesulfonic acid-formaldehyde condensation products.

6. The process of claim 1 or 2 wherein the dispersion contains 1 to 20% by weight of protective colloid based on the polymer.

7. The process of claim 1 or 2 wherein the total amount of the protective colloid and of the water-soluble substances having a $T_g \geq 60°$ C. during the spray-drying is from 5 to 50% by weight based on the polymer.

8. The product produced by the process of claim 1.

* * * * *

UNITED STATES PATENT AND TRADEMARK OFFICE
CERTIFICATE OF CORRECTION

PATENT NO. : 4,859,751

DATED : Aug. 22, 1989

INVENTOR(S) : Joachim Schulze et al

It is certified that error appears in the above-identified patent and that said Letters Patent is hereby corrected as shown below:

| Col. | Line | | |
|---|---|---|---|
| Abstract [57] | 20 | "$\eta/60°C$, f)" should be | --$\eta/60°C$, f)-- |
| 3 | 60&61 | "sulfoethyl(-meth)" should be | --sulfoethyl(-meth)-- |
| 5 | 61 | "$\eta/60°C$" should be | --$\eta/60°C$-- |
| 8 | 56 | "1.5°C" should be | --1.5°C--. |
| 8&9 | 68&1 | "4°C" should be | --4°C-- |
| 9 | Table I | "Höppler" should be | --Hoppler-- |
| 10 | 5 | "40°C" should be | --40°C-- |
| 14 | 14 | "2460°C" should be | --$\eta/60°C$-- |
| 14 | 27 | "$\eta/60°C$" should be | --$\eta/60°C$-- |

Signed and Sealed this

Tenth Day of April, 1990

Attest:

HARRY F. MANBECK, JR.

Attesting Officer

Commissioner of Patents and Trademarks